United States Patent [19]

Blasius et al.

[11] 4,452,702

[45] Jun. 5, 1984

[54] PROCESS FOR THE EXTRACTION OF CESIUM IONS FROM AQUEOUS SOLUTIONS USING AN ADDUCT COMPOUND CONTAINING A MACROCYCLICAL POLYETHER AND AN INORGANIC HETEROPOLY ACID

[75] Inventors: Ewald Blasius, Saarbrücken; Karl-Heinz Nilles, St. Ingbert, both of Fed. Rep. of Germany

[73] Assignee: Kernforschungszentrum Karlsruhe GmbH, Karlsruhe, Fed. Rep. of Germany

[21] Appl. No.: 412,799

[22] Filed: Aug. 27, 1982

[30] Foreign Application Priority Data

Aug. 31, 1981 [EP] European Pat. Off. ............ 81106783

[51] Int. Cl.$^3$ .............................................. B01D 11/04
[52] U.S. Cl. ...................................... 210/638; 423/181
[58] Field of Search ............... 210/638, 679, 681, 682; 423/181

[56] References Cited

U.S. PATENT DOCUMENTS 2,925,323  2/1960  Rimshaw ............................. 423/181
3,097,920  7/1963  Knoll .................................. 423/181
4,033,764  7/1977  Colegate et al. ..................... 210/679
4,087,375  5/1978  Tanno ................................. 210/682

FOREIGN PATENT DOCUMENTS 149403   7/1973  Czechoslovakia .
149404   7/1973  Czechoslovakia .
165751  11/1976  Czechoslovakia .

OTHER PUBLICATIONS

Angewandte Chemie, Vol. 78, 1966, pp. 19-27, W. Fischer et al., "Grundlagen und Entwicklung des Verfahrens zur Trennung der Elemente Zirkonium und Hafnium durch Verteilen ihrer Thiocyanate".
Journal of Radioanalytical Chemistry, vol. 35 (1977) pp. 351-359, J. Rais et al., "New Types of Sorbents Based on Polyethers and Some Hydrophobic Anions".
Journal of the American Chemical Society, vol. 89, No. 23, Nov. 8, 1967, C. J. Pedersen, "Cyclic Polyethers and Their Complexes with Metal Salts", pp. 7017-7036.
Anal. Chemie 1980, 52, pp. 1115-1119, American Chemical Society, Fernando et al., "Ion-Exchange Properties of Crown Ether-Phosphomolybdic Acid Precipitates".
Energie Nucleaire, vol. 14, No. 1, Jan.-Feb. 1972, pp. 38-44, J. C. Mora "Conception et realisation d'un reacteur de destruction thermique de nitrate d'ammonium en vue de la recuperation de Cesium 137".
Radiochem. Radioanal. Letters 6/4/257-264/1971, pp. 257-264, J. Rais et al. "New Extraction Agents for Cesium-III, Complex Formed Between Some Cesium Salts and 2,3,11,12-Dibenzo-1,4,7,10,13,16-Hexaoxocyclo-octadeca-2,11-Diene/Dibenzo-18-Crown-6.
Radiochem. Radioanal. Letters 38/5-6/387-394/1979/pp. 387-394, Fernando et al. "Alkali Metal Ion Specificity of a Crown Ether Precipitate with Phosphomolybdic Acid".
Abstract No. 108 of Fernando et al., Radiochemical Study of Ion Exchangers from Crown Ehters and Phosphomolybdic Acid, Department of Chemistry, North Carolina State University, Raleigh, North Carolina 27650.

Primary Examiner—Ivars C. Cintins
Attorney, Agent, or Firm—Sughrue, Mion, Zinn, Macpeak & Seas

[57] ABSTRACT

A process for the extraction of cesium ions from an aqueous solution with an adduct compound containing a macrocyclical polyether and an inorganic heteropoly acid component. An organic phase in the form of a solution of an adduct compound in a polar organic solvent is prepared. The adduct compound is the product of a crown ether containing at least one species of the structural elements

I

-continued

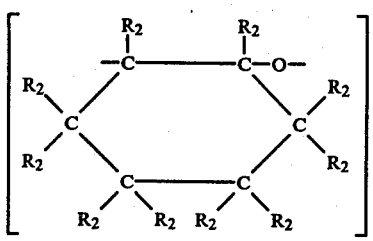
II

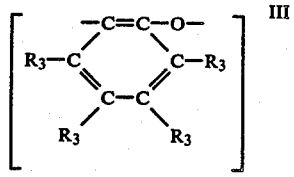
III where, in structure I, n represents one of the numbers 0, 1 or 2, the —C—(C)$_n$—O group forms part of the polyether ring and $R_1$ is H, $CH_3$, phenyl up to 4 $R_1(\neq H)$; in structure II, the —C—C—O— group forms part of the polyether ring and $R_2$ is H, $CH_3$, t-butyl, pentyl, heptyl, nonyl, $(CH_2)_9CH_3$, phenyl up to 2 $R_2(\neq H)$; and in structure III, the —C=C—O group forms part of the polyether ring and $R_3$ is H, $CH_3$, t-butyl, pentyl, heptyl, nonyl, $(CH_2)_9CH_9$, phenyl up to 2 $R_3(\neq H)$; with (b) an inorganic heteropoly acid, which is stable in a strongly acid and oxidizing medium, or a salt of the inorganic heteropoly acid. The aqueous solution containing the cesium ions is brought into contact with the adduct compound to extract the cesium from the aqueous phase into the organic phase. The organic phase charged with cesium ions is separated from the aqueous solution.

13 Claims, 2 Drawing Figures

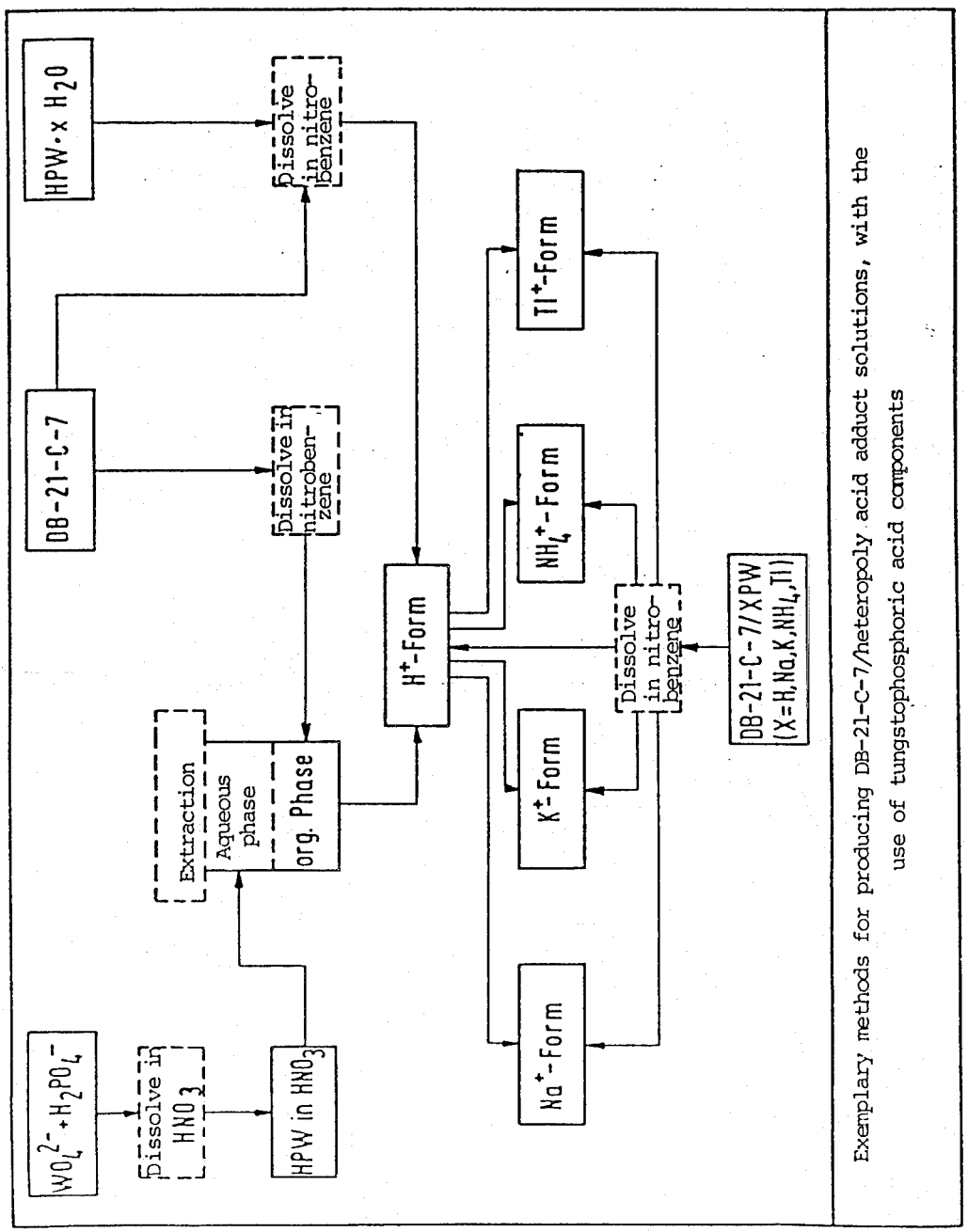

PROCESS FOR THE EXTRACTION OF CESIUM IONS FROM AQUEOUS SOLUTIONS USING AN ADDUCT COMPOUND CONTAINING A MACROCYCLICAL POLYETHER AND AN INORGANIC HETEROPOLY ACID

BACKGROUND OF THE INVENTION

The present invention relates to a process for the extraction of cesium ions from aqueous solutions using an adduct compound comprising a macrocyclic polyether (crown ether) and an inorganic heteropoly acid component.

The processing and solidification of medium active aqueous wastes (MAW), developed during the reprocessing of irradiated nuclear fuels and/or nuclear breeder materials, e.g., in form of waste solutions, waste concentrates or waste sludges, is rendered more difficult by the presence of small quantities of the cesium isotopes $Cs^{134}$ and $Cs^{137}$. During the vitrification of MAW, cesium evaporates to a noticeable degree and is also easily leached out of the solidified products intended for permanent storage, such as glass blocks, cement blocks and bitumen blocks. Selective extraction of the Cs would considerably simplify the treatment of medium active wastes. Furthermore, if $Sr^{90}$ were simultaneously extracted from the MAW, low radioactive aqueous wastes (LAW=low active waste) would be obtained since, after a relatively short decay period, practically the entire activity of MAW originates from the relatively long-lived radionuclides $Cs^{137}$ ($t_{\frac{1}{2}}=30$ yrs) and $Sr^{90}$ ($t_{\frac{1}{2}}=26$ yrs).

According to prior-art processes, the extraction of Cs and Sr was achieved mainly by means of coprecipitation reactions. The coprecipitation reactions, however, did not result in satisfactory DF (decontamination factor) values for Sr and Cs. Therefore, different processes have been investigated which would make possible a selective extraction of the two radionuclides, either jointly or individually.

The extraction processes for $Cs^+$ ions developed thus far, however, are not suited for the extraction of $Cs^+$ from a typical MAW with a high concentration of $NaNO_3$ and free nitric acid. The composition of such a typical MAW is shown in the following Table 1:

TABLE 1

| Components (strongly acidic MAW) | Concentration g/dm³ | |
|---|---|---|
| Nitric acid | 64 | (1 mol/dm³) |
| Sodium nitrate | 42.5 | (0.5 mol/dm³) |
| Uranium | 1.0 | |
| Lead | 0.8 | |
| Calcium | 0.2 | |
| Magnesium | 0.2 | |
| Iron | 0.15 | |
| Ruthenium | 0.07 | |
| Potassium | 0.05 | |
| Zinc | 0.05 | |
| Copper | 0.04 | |
| Manganese | 0.02 | |
| Chromium | 0.02 | |
| Nickel | 0.01 | |
| Zirconium | 0.005 | |
| Cesium | 0.004 | |
| Cerium | 0.004 | |
| Strontium | 0.002 | |
| Antimony | 0.002 | |
| Niobium | 0.001 | |

The extraction processes for $Cs^+$ ions that have been developed use mostly organic reagents which are added either to the organic phase or to the aqueous phase to be extracted. These reagents, however, would be destroyed either hydrolytically or by oxidation, or would be made ineffective by protonization if they came into contact with the MAW whose essential components are such as those described in Table 1 above.

$Cs^+$ selective heteropoly acids are known which are very stable in the highly acid environment provided by an MAW having a composition such as described in Table 1. The $Cs^+$ selective heteropoly acids are used as extraction agents in the form of an organic phase with nitrobenzene as a solvent. For example, 12-molybdophosphoric acid (HPMo) is a $Cs^+$ selective heteropoly acid which can be dissolved in nitrobenzene. In this form, the heteropoly acids are equally unsuitable for the continuous $Cs^+$ extraction from an MAW of the type described in the above Table 1, since they bleed considerably from the nitrobenzene into the aqueous phase due to their good water solubility. They would have to be replaced continuously.

If HPMo is used, the molybdenum would enter into the MAW in large quantities and would furthermore interfere with the subsequent processing of the MAW, such as during vitrification. Finally, depending on the $Cs^+$ concentration of the MAW and the heteropoly acid concentration in the nitrobenzene phase, there is the danger of precipitate formation which could lead to considerable disruptions in a continuously operating system.

In contrast to the above prior-art water soluble extraction agents for $Cs^+$, dibenzo crown ethers have a very low water solubility and are thus, at least in part, suitable for use in a continuous extraction process.

Since crown ethers are neutral ligands, the anion in the aqueous solution being treated is also extracted during the extraction. This, however, significantly influences the extraction coefficient. In this way, simple cesium salts, such as chloride and nitrate salts, are very difficult to extract with the use of crown ethers in polar solvents, with the exception of nitromethane solutions and nitrobenzene solutions. For this reason, the prior art started to combine crown ethers with known $Cs^+$ specific reagents which contain voluminous, polarizable anions. Up to now, this has been done by adding the $Cs^+$ specific reagents, in most cases picric acid to the aqueous phase to be extracted, and extracting with the aid of crown ethers, in most cases dibenzo-18-crown-6 (DB-18-C-6) or dicyclo-hexyl-18-C-6, in polar solvents, in most cases nitrobenzene.

For the extraction of $Cs^+$ from nuclide containing solutions, J. Rais and P. Selucky proposed two extraction systems which use DB-18-C-6. In one method, as described in Czechoslovakian Pat. No. 149403, DB-18-C-6 was employed in an organic phase and dipicrylamine was added to the aqueous phase to be extracted. In a second method, as described in Czechoslovakian Pat. No. 149404, DB-18-C-6 was employed in an organic phase and sodium tetraphenylborate was added to the aqueous phase to be extracted.

These processes, however, are limited to alkaline $Cs^+$ solutions having a pH of 11 to 13 inasmuch as dipicrylamine is protonized in the acid range, and sodium tetraphenylborate is hydrolyzed in the acid range. Moreover, both processes only function well in the absence of large quantities of $Na^+$ and $K^+$.

Furthermore, the same authors, as disclosed in Czechoslovakian Pat. No. 165751, have produced an adduct of DB-18-C-6 with 12-molybdophosphoric acid which permits a column chromatographic extraction of the Cs+ from waste solutions. Large quantities of Na+ and K+, however, also present a problem here. The adduct of DB-18-C-6 with 12-molybdophosphoric acid was prepared by a two phase reaction in which an organic phase comprising a solution of the crown ether in dichloromethane was shaken with an aqueous phase comprising a solution of HPMo in 2 mol/l HNO$_3$. This patent also refers generally to adducts with 12-tungstophosphoric acid (HPW). A similar disclosure of an adduct of DB-18-C-6 with molybdophosphoric acid appears in *J. Radioanal. Chem.* Vol. 35 (1977), pages 351 to 359.

SUMMARY OF THE PRESENT INVENTION

It is an object of the present invention to provide an improved process for the extraction of cesium ions from an aqueous solution of the above-described type.

Another object of the present invention is to provide such a process with functions successfully, in discontinuous as well as in continuous operation, even in the presence of large quantities of sodium and potassium ions, and without being limited to certain pH ranges of the starting solutions.

It is a further object of the present invention to prevent bleeding of the heteropoly acid as well as the formation of undesirable precipitates.

To achieve the foregoing objects and in accordance with its purpose, the present invention provides a process for extracting cesium ions from an aqueous solution with an adduct compound containing a macrocyclical polyether and an inorganic heteropoly acid component, comprising: producing an organic phase in the form of a solution of an adduct compound in a polar organic solvent, the adduct compound being the product of (a) a crown ether containing at least one species of the structural elements

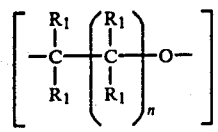  I

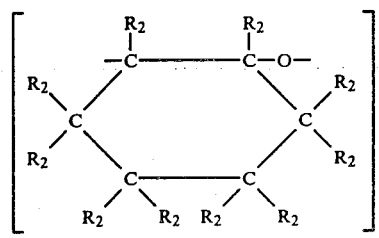  II

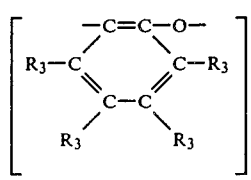  III where, in structure I, n represents one of the numbers 0, 1 or 2, the —C—(C)$_n$—O group forms part of the polyether ring and R$_1$ is H,CH$_3$, phenyl up to 4 R$_1$($\neq$H); in structure II, the —C—C—O— group forms part of the polyether ring and R$_2$ is H,CH$_3$, t-butyl, pentyl, heptyl, nonyl, (CH$_2$)$_9$CH$_3$, phenyl up to 2 R$_2$ ($\neq$H); and in structure III, the —C=C—O group forms part of the polyether ring and R$_3$ is H,CH$_3$, t-butyl, pentyl, heptyl, nonyl, (CH$_2$)$_9$CH$_3$, phenyl up to 2 R$_3$($\neq$H); with (b) an inorganic heteropoly acid which is stable in a highly acid and oxidizing medium, or a salt of the inorganic heteropoly acid; bringing the aqueous solution containing the cesium ions into contact with the adduct compound solution to extract the cesium from the aqueous solution into the organic phase and thereby charge the organic phase; and separating the charged organic phase from the aqueous solution.

In one embodiment of the process according to the present invention, the solution of the adduct compound is used as such. In an advantageous embodiment of the process of the present invention, the solution of the adduct compound is not used as such, but is applied as a liquid ion exchanger phase on silica gel, as carrier material, before its contact with the aqueous solution containing the cesium ions. Thus, by applying the adduct solution to silica gel as carrier material, there is provided a stationary phase which can be used for liquid-liquid distribution chromatography (liquid ion exchanger phase), where the stationary phase is brought in contact with the aqueous solution containing the cesium ions to extract the cesium from the aqueous solution, during which process the stationary phase is charged with cesium ions. Thus, in the practice of the present invention, the aqueous solution containing the cesium ions is brought into contact with the solution of the adduct compound, either as such or as applied on silica gel, to charge the adduct compound solution with cesium ions, and the resulting aqueous solution, which is now free of cesium or contains only small amounts of cesium, is separated from the charged adduct compound solution.

In an especially advantageous embodiment of the present invention, the solution of the adduct compound contains, as polar organic solvent, nitrobenzene or a mixture of nitrobenzene and at least one solvent from the group 1,1,2,2-tetrachloroethane, chloroform, 1,2-dichloroethane and 1,2-dichlorobenzene.

Preferably, the heteropoly acid component is one of the following acids: 12-molybdophosphoric acid (HPMo); 12-tungstophosphoric acid (HPW); 12-molybdosilicic acid (HSiMo); or 12-tungstosilicic acid (HSiW).

In one preferred embodiment of the invention, the production of the adduct solution is achieved by dissolving the individual components of the adduct compound in the polar organic solvent, preferably nitrobenzene, in a molar ratio of crown ether to HPMo of $\geq$3:1; crown ether to HPW of $\geq$3:1, crown ether to HSiMo of $\geq$4:1; and crown ether to HSiW of $\geq$4:1.

In another preferred embodiment of the invention, the adduct solution is prepared by dissolving an adduct compound, in solid form, in the polar organic solvent. The solid adduct can be the H+ form of the adduct, or the M(I) charged form, where M(I) is Na, K, Tl or NH$_4$. In one preferred embodiment of this technique, a solid adduct compound in the H+ form is dissolved in the polar organic solvent, the adduct compound having been obtained in amorphous or crystalline state by mixing (a) a crown ether solution with (b) a heteropoly acid solution, and then separating the solvents which were used to form solutions (a) and (b).

In still another preferred embodiment of this technique, the adduct solution is prepared by dissolving an adduct compound in a corresponding existing M(I) charged form, where M(I) is Na, K, Tl or NH₄, the adduct compound having been obtained in amorphous or crystalline state by adding a M(I) nitrate solution to a clear solution of a crown ether, preferably a dibenzo crown ether, and a heteropoly acid to precipitate the adduct compound; and then separating solvents from the precipitated adduct compound.

It is to be understood that both the foregoing general description and the following detailed description are exemplary, but are not restrictive of the invention.

BRIEF DESCRIPTION OF THE DRAWINGS

FIG. 2 schematically illustrates various possibilities for producing a crown ether/heteropoly acid/salt adduct solution containing a DB-21-C-7/HPW adduct in accordance with the teachings of the present invention.

DETAILED DESCRIPTION OF THE INVENTION

Figure 1:
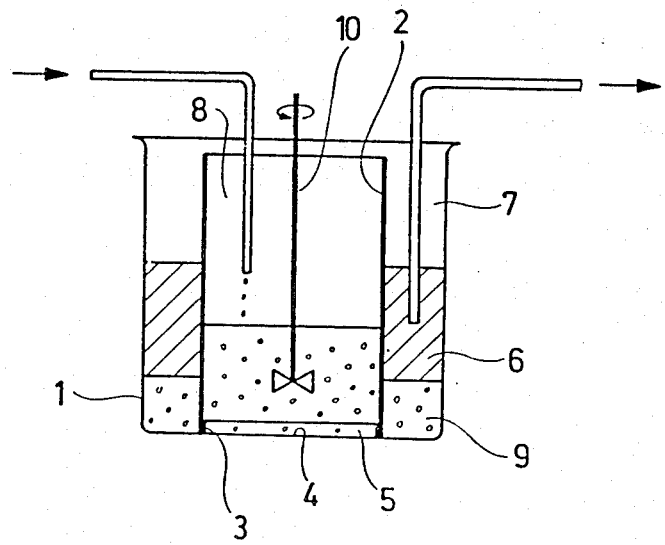
FIG. 1 shows an apparatus in which an extraction can be formed in accordance with the teaching of the present invention.

The adduct compounds employed in the present invention are the product of (a) a macrocyclic polyether (crown ether) and (b) an inorganic heteropoly acid component which is an inorganic heteropoly acid or a salt of the inorganic heteropoly acid.

Preferably, the macrocyclic polyether is selected from the group 2,3,11,12-dibenzo-1,4,7,10,13,16-hexa-oxa-cyclo-octadeca-2,11-diene, known as dibenzo-18-crown-6, and abbreviated DB-18-C-6, or 2,5,8,15,18,21-hexa-oxa-tricyclo[20.4.0.09,14]hexacosane, known as dicyclohexyl-18-crown-6, and abbreviated DC-18-C-6; or higher homologues thereof having up to 30 atoms in ring form, and containing up to 10 oxygen atoms; and benzo-15-crown-5, abbreviated B-15-crown-5. The DB-18-C-6 and DC-18-C-6 crown ethers contain 18 atoms in their polyether ring, and higher homologues of these ethers refer to crown ethers having more than 18 atoms in their polyether ring. A preferred higher homologue which is suitable in the practice of the present invention is DB-21-C-7.

B-15-crown-5 and DB-18-C-6 are exemplary of crown ethers which contain structural elements III, with B-15-crown-5 containing one such structural element III and DB-18-C-6 containing two structural elements III. DC-18-C-6 is exemplary of crown ethers which contain structural elements II, and specifically contains two of such structural elements II. Generally, crown ethers containing up to 30 atoms in their polyether ring and containing structural elements I and/or II and/or III, contain either elements I or elements II or elements III, contain up to 4 of structural elements II or III. See C. J. Pedersen, *J. Am. Chem. Soc.*, Volume 89, page 7017 et seq for a description and naming of crown ethers.

In another preferred embodiment of the present invention the adduct compound is the product of (i) a crown ether with an polyether ring containing 21 atoms and 7 O-atoms with one or more $R_1$ and/or $R_2$ and/or $R_3$ ($R_1$ = H, CH₃, phenyl,
$R_2$ = H, CH₃, t-butyl, pentyl, heptyl, nonyl, (CH₂)₉CH₃, phenyl
$R_3$ = H, CH₃, t-butyl, pentyl, heptyl, nonyl, (CH₂)₉CH₃, phenyl)

with (ii) an inorganic heteropoly acid or a salt of the inorganic heteropoly acid.

In the following suitable crown ethers as examples are listed:

Elements I:

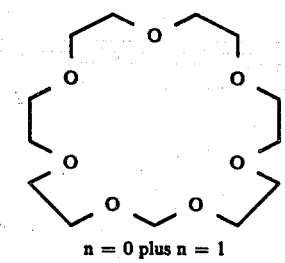

n = 0 plus n = 1

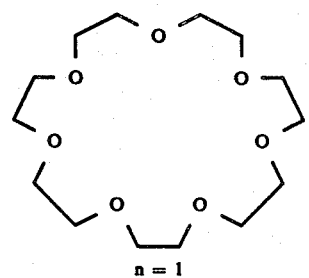

n = 1

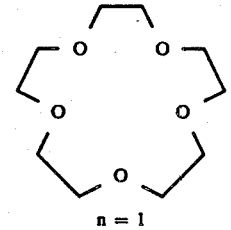

n = 1

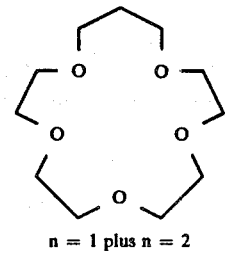

n = 1 plus n = 2

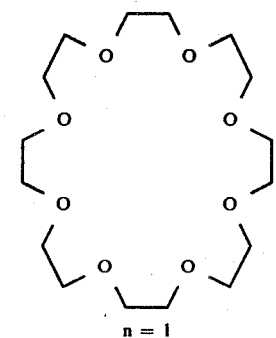

n = 1

-continued

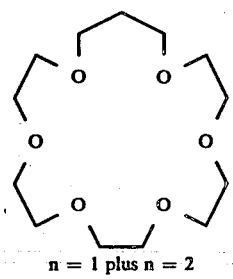

n = 1 plus n = 2

Elements I and elements II with R₂

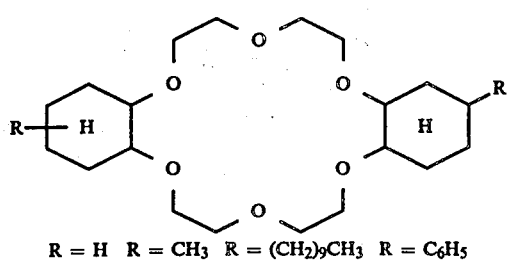

R = H  R = CH₃  R = (CH₂)₉CH₃  R = C₆H₅

Elements I and one element II

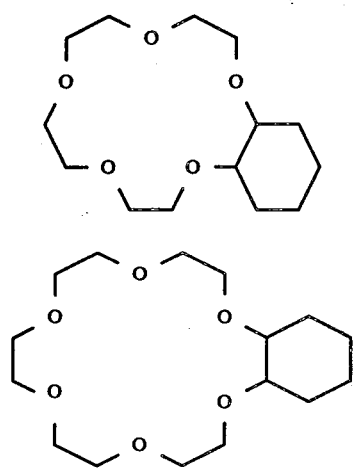

Elements I and one element III with R₃

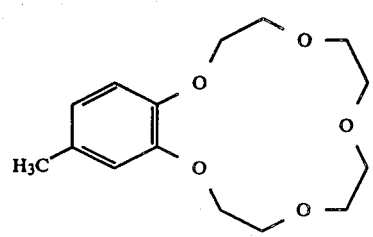

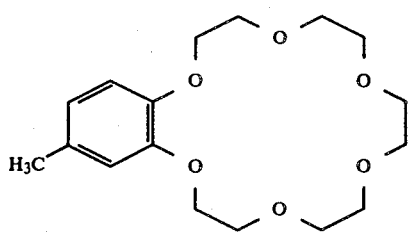

Elements I and elements III (or II)

-continued

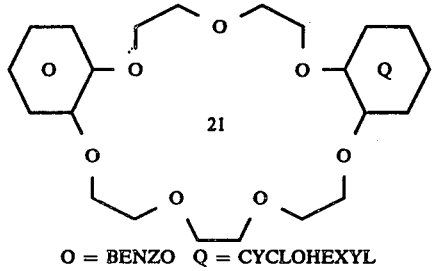

O = BENZO  Q = CYCLOHEXYL

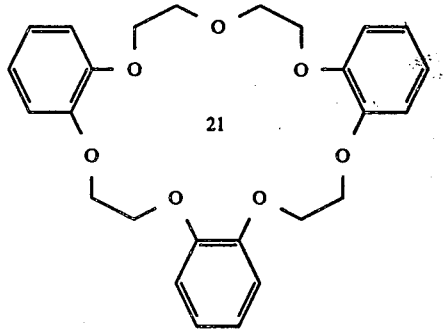

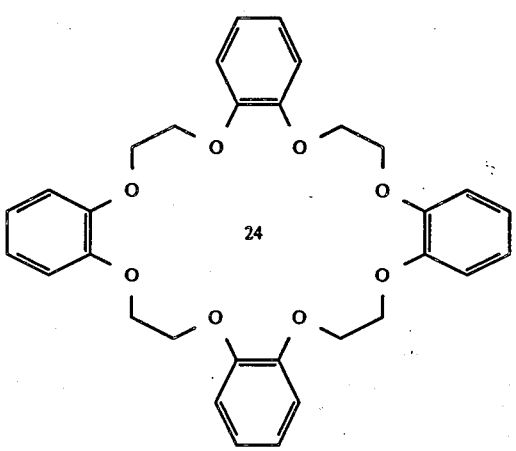

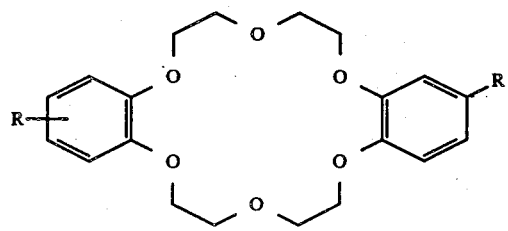

Elements I and one element II and one element III

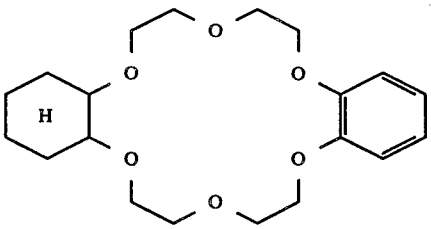

The inorganic heteropoly acid which is used to form the adduct employed in the present invention preferably is selected from the group 12-molybdophosphoric acid (HPMo); 12-tungstophosphoric acid (HPW); 12-molybdosilicic acid (HSiMo); and 12-tungstosilicic acid (HSiW). The preferred inorganic heteropoly acid salts which can be used for the adduct compound employed in the present invention are the Na, K, Tl or NH4 salts of these acids. These salts are referred to as the M(I) charged form of the acids, where M(I) is Na, K, Tl or NH4.

The adduct compounds employed in the present invention generally have a molar ratio of polyether to inorganic heteropoly acid component of at least 3:1. Preferably, the molar ratio of crown ether to the phosphorous containing heteropoly acid components (e.g. HPMo, HPW, and their salts) is $\geq 3:1$ (up to 6:1), and the molar ratio of crown ether to the silica containing heteropoly acid components (e.g. HSiMo, HSiW, and their salts) is $\geq 4:1$ (up to 6:1). As used herein throughout the specification and claims, when molar ratios of crown ether to heteropoly acid component are given, the moles of inorganic heteropoly acid component are based on the moles of phosphorus or silica, respectively, in these components.

In the present invention, the adduct compounds are employed in the form of a solution in a polar organic solvent to effect extraction of Cs ions from aqueous solution. The solution of the adduct compound preferably contains, as polar organic solvent, nitrobenzene, or a mixture of nitrobenzene with at least one solvent from the group 1,1,2,2-tetrachloroethane, chloroform, 1,2-dichloroethane and 1,2-dichlorobenzene. When employing a mixture of nitrobenzene with another solvent, the solvent mixture preferably contains a volume ratio of nitrobenzene to other solvent of, 2:1 to 3:1.

The adduct solution can be prepared by a number of different methods. For example, adduct solutions can be prepared by directly dissolving the individual adduct components, i.e. the macrocyclic polyether and the heteropoly acid in the polar organic solvent to obtain the adduct solution. In addition, the adduct solution can be prepared by extracting the heteropoly acid from an aqueous solution, for example from a nitric acid solution (0,5 M up to 2 M) into an organic phase comprised of the polar organic solvent containing the macrocyclic polyether, in a molar ratio polyether to heteropoly acid in the aqueous phase $\geq 3:1$ or $\geq 4:1$ respectively, and then separating the organic phase from the aqueous solution. The above two methods generally are used to prepare adduct solutions which contain the H+ form of the adduct, which can then be converted to adduct solutions containing the M(I) charged form by bringing them in contact with an aqueous solution containing the corresponding M(I) nitrate solution. Alternatively, an adduct solution can be prepared by dissolving a solid adduct, either the pure H+ form or the charged M(I) form, in the polar organic solvent. Various techniques for producing the adduct compound are explained in detail below.

Thus, the production of the adduct solution can be achieved by dissolving the individual adduct components, for example, DB-21-C-7 and the desired heteropoly acid, in the organic polar solvent, preferably nitrobenzene, in a molar ratio of crown ether to heteropoly acid $\geq 3:1$ in the case of HPMo and HPW, and in a molar ratio $\geq 4:1$ in the case of HSiMo and HSiW.

The resulting synergistically acting adduct solutions represent liquid exchangers in the H+ forms, with the HPMo and HPW adducts having three and the HSiMo and HSiW adducts having four exchangeable protons.

Other charged forms of the liquid exchangers, for example, the Na+, K+, NH4+, Tl+ forms, can easily be obtained by shaking the H+ form of the liquid exchanger with the corresponding M(I)-nitrate solution. For example, the NH4+ form of the liquid exchanger can be obtained by shaking the H+ form adduct solution for 1 hour with 3 mol/l NH4NO3 solution. Similarly, the K+ form of the liquid exchanger can be obtained by shaking the H+ form adduct solution for 1 hour with 2 mol/l KNO3 solution.

In addition to the direct production of the adduct solution by dissolving the individual adduct components in the organic solution, or by extracting the heteropoly acid from an aqueous phase into an organic phase containing the crown ether, it is possible to first isolate the adduct in solid form, and then to employ the solid adduct, dissolved in the corresponding polar organic solvent, as needed. This applies to the H+ form of the adducts as well as to the M(I) charge form.

When isolating the adduct in solid form, the adduct preferably is prepared from a homogeneous phase. An attempt was made to isolate the heteropoly acid adduct DB-21-C-7/HPMo by following the general procedure disclosed in *J. Radioanal. Chem.* Volume 35 (1977) 351 and Czechoslovakian Patent No. 165751 (1976). These publications, as discussed previously, disclose a process for producing an adduct by shaking a crown ether solution, specifically DB-18-C-6, in dichloromethane with a solution of HPMo or HPW, respectively, in 2 mol/l HNO3. When this procedure was applied to DB-21-C-7/HPMo, the process resulted only in a sticky, viscous dark brown mass, as compared to the microcrystalline product obtained through conversion using DB-18-C-6. The yield of DB-21-C-7/HPMo after further processing of the viscous product was only 50%.

By following techniques which are within the scope of the present invention, however, the adduct DB-21-C-7/HPMo can be quantitatively isolated if the production takes place in a homogenous phase.

By simple dissolution in nitrobenzene of the amorphous or crystalline adduct compounds, produced according to the Techniques 1a, 1b, 2 and 3 described below, the heteropoly acid adduct solutions required for the extraction of the process according to the present invention are then also obtained.

The production of the adducts in solid form which can be dissolved to form the adduct solutions employed in the present invention, will now be illustrated by the following Techniques 1a, 1b, 2 and 3. In these techniques, the following chemicals were used: $H_3[PMo_{12}O_{40}] \cdot xH_2O$ with $x \approx 29$; $H_3[PW_{12}O_{40}] \cdot xH_2O$ with $x \approx 24$ by Merck; and DB-21-C-7, produced according to an improved technique based on the work of C. J. Pedersen in *J. Am. Chem. Soc.* Volume 89 (1967) page 7017 et seq.

Technique 1a

This technique illustrates the production of the 3:1 adduct (DB-21-C-7/HPMo [3:1]).

A first solution is produced by dissolving 0.5 g DB-21-C-7 (0.00124 mol) in 40 cm³ acetone. A second solution is produced by dissolving 0.97 g HPMo.29 g H2O in 20 cm³ acetone. An exact molar ratio of 3:1 must be accurately maintained. Both solutions are united, and the acetone solvent is extracted in a vacuum, during which process the temperature may reach up to 50° C. In this manner a brownish green loose product is obtained (1.25 g) which, when dissolved in nitrobenzene, has the same extraction qualities as the adduct produced by direct dissolution of the individual adduct components in nitrobenzene.

Technique 1b

This technique illustrates the production of the 4:1 adduct (DB-21-C-7/HPMo [4:1]).

The procedure employed in Technique 1b is the same as that employed in Technique 1a, except that 0.67 g DB-21-C-7 (0.00165 mol) was used instead of 0.5 g. A yellow-brown product of still lower bulk density is obtained.

The 3:1 adducts and 4:1 adducts obtained according to Techniques 1a and 1b, respectively, can easily be pulverized in a mortar into products of higher bulk density.

In the present invention, the adducts are employed in an adduct solution in liquid-liquid extraction operations, and to so employ the adducts, especially in continuous operation, the ratio DB-21-C-7: heteropoly acid must be at least 3:1. If adducts with molar ratios <3:1 are used, which also can be produced according to Technique 1a, the heteropoly acid bleeds out during the extraction operation until a ratio of 3:1 is reached. In the above-mentioned method described in *J. Radioanal Chem.*, Volume 35 (1977) 351 and Czechoslavokian Pat. No. 16551 (1976), the $\geq 3:1$ adduct is always formed.

Technique 2

This technique illustrates the production of the $\geq 3:1$ DB-21-C-7/HPMo adduct by means of a precipitation reaction.

In this technique, while stirring, a solution of 0.5 g DB-21-C-7 in 20 cm$^3$ dioxane is caused to flow into an aqueous solution of 1.3 g HPMo.29 H$_2$O in 200 cm$^3$ of 0.5 mol/l HNO$_3$ during which process a voluminous precipitate is deposited. This precipitate is separated by means of a Büchner funnel. The separated precipitate is then washed first with 0.5 mol/1 HNO$_3$ and subsequently with H$_2$O. The washed precipitate is then dried in a vacuum at 50° C.

Technique 3

This technique illustrates the production of charged forms of the heteropoly acid adducts.

In the present invention, the charged forms of the heteropoly acid adducts can, for the first time, be directly isolated as microcrystalline products. The Na$^+$, K$^+$, NH$_4$$^+$ and Tl$^+$ forms can be produced according to the following general procedure, demonstrated on the example of HPMo to obtain a $\geq 3:1$ adduct.

A solution of 1.0 g HPMo.29 H$_2$O in 10 cm$^3$ H$_2$O is poured into a solution of 0.5 g DB-21-C-7 in 20 ml dioxane, whereby, after a brief period of stirring, a clear solution is obtained. Under stirring, 5 cm$^3$ of the corresponding cold saturated M(I) nitrate solution, where M(I) represents Na$^+$, K$^+$, NH$_4$$^+$ or Tl$^+$, is added within 1 minute, during which process a yellow voluminous precipitate is precipitated. After stirring for another ½ hour, the precipitate is subsequently filtered by suction by means of a Büchner filter, is washed first with 50 cm$^3$ of the corresponding 0.5 mol/1 M(I) nitrate solution, and subsequently with 20 cm$^3$ H$_2$O. The K$^+$, NH$_4$$^+$ and Tl$^+$ forms are dried at 110° C., the Na$^+$ form at 90° C. A yellow to ocher-yellow powder is obtained whose quantitative yield is approximately 1.3 g.

All remaining DB-21-C-7 heteropoly acid adducts, that is, adducts with other acids, as well as adducts having different crown ethers, can be produced according to Techniques 1a to c, 2 and 3. These adducts then can be dissolved in the polar organic solvent to form adduct solutions which can be employed in the present invention to extract cesium ions.

Surprisingly, it has been found that from the homologue series DB-18-C-6 to DB-30-C-10, only DB-21-C-7 is suitable for the Cs$^+$ extraction from an acid MAW solution having the composition of Table 1 if the crown ether is used alone, i.e. without an adduct partner, as illustrated in the following Table 2 where D represents the extraction coefficient:

TABLE 2

| Crown ether alone, without adduct partner | D | Extraction Percentage |
|---|---|---|
| DC-18-C-6 | 0.02 | 1.5 |
| DB-18-C-6 | 0.02 | 1.9 |
| DB-21-C-7 | 1.03 | 50.7 |
| DB-24-C-8 | 0.09 | 8.2 |
| DB-27-C-9 | 0.11 | 9.9 |
| DB-30-C-10 | 0.19 | 16.1 |

Solvent: nitrobenzene
Crown ether concentration: 0.012 mol/l

As can be seen from Table 2, even if DB-21-C-7 is used by itself, an extraction coefficient D of >1 is obtained. If DB-21-C-7 is combined with an inorganic compound which is stable in acid and oxidizing mediums, e.g. with one of the inorganic heteropoly acids mentioned above, and if both extraction agents are left to work dissolved in the organic phase from the beginning, higher extraction coefficients are obtained. Dibenzo-24-crown-8 (alone or with adduct partner), because of its ring diameter which is the optimum for Cs$^+$, is even more suitable in respect to cesium selectivity. Dibenzo-24-crown-8, however, furnishes only extraction coefficients comparable to that of DB-18-C-6.

The following Table 3 shows the D values, already obtained after a simple batch operation using the above-mentioned MAW of Table 1, for nitromethane and nitrobenzene as solvents, and having different crown ether concentrations. In the batch operation the volume of organic phase ($V_{org}$) was equal to the volume of the aqueous phase ($V_{aqueous}$), which was equal to 10 cm$^3$, and the time (t) for the extraction was 1 hour.

TABLE 3

| Solvent | 0.012 M DB-21-C-7[1] (without adduct partner) | 0.018 M DB-21-C-7[2] (without adduct partner) |
|---|---|---|
| nitrobenzene | 1.03 | 1.27 |
| nitromethane | 2.03 | 2.87 |

[1]400-fold excess, with respect to $c_{Cs^+}$ in MAW (4 ppm)
[2]600-fold excess, with respect to $c_{Cs^+}$ in MAW (4 ppm).

Equilibrium was reached very quickly in the above batch operation, with the extraction of the Cs$^+$ (as CsNO$_3$) being favorably affected by the high nitrate concentration of the MAW (salting out effect). In spite of its high extraction coefficient, however, nitromethane cannot be recommended as a solvent because of its relatively high solubility in water. Thus, nitromethane has a water solubility of 11% as compared to 0.2% for nitrobenzene.

According to the present invention, a combination of a crown ether, e.g. DB-21-C-7, with the inorganic heteropoly acid component (which by itself is a Cs$^+$ specific extraction agent) leads to a synergistic elevation of the extraction coefficient, which is sometimes considerable. The crown ether not only raises or makes possible the solubility of the inorganic heteropoly acid components (which by themselves are $Cs^+$ specific extraction reagents) in certain organic solvents, but also prevents almost completely their bleeding or stabilizes them in such a way that they can be employed outside their normal range of existence. These $Cs^+$ specific inorganic heteropoly acid components normally exist in strongly acid medium, but in accordance with the present invention can, under appropriate conditions, be employed in a pH range up to pH 13.

The high degree of solubility of the adducts employed in the present invention, such as an HPMo or HPW adduct, in nitrobenzene permits a high adduct charge of the organic phase, making possible high adduct concentrations, such as, for example, up to 0.016 ml/l, based on the mols of phosphorus, for the HPMo or HPW adducts or their salts. For the extraction of $Cs^+$ from the above MAW, shown in Table 1, a solution containing an adduct concentration of this kind, provides extraction coefficients of about 100. If an adduct solution is used which contains 0.004 mol/l of adduct, based on the mols of phosphorus, extraction coefficients of around 30 are obtained.*

*For the HSiMo or HSiW adducts or their salts extraction coefficients of the same magnitude were obtained with concentrations of the adducts of 0.003 mol/l to 0.008 mol/l, based on the mols of Si.

In a preferred embodiment of the present invention, the charged adducts can be easily regenerated by continuous or discontinuous re-extraction of the cesium ions from the charged organic phase by contacting the charged organic phase with an alkali metal salt solution or ammonium salt solution. The regenerated organic phase subsequently can be reused to treat another charge. The salt solution obtained after such regeneration, and containing the radioactive cesium, can be evaporated and the concentrate or the resulting salt cake can be transferred to a solidification matrix suitable for permanent storage. Alternatively, the concentrate or salt cake, respectively, can be added to the highly radioactive waste.

The following examples are given by way of illustration to further explain the principles of the invention. These examples are merely illustrative and are not to be understood as limiting the scope and underlying principles of the invention in any way. All percentages referred to herein are by weight and all ratios for the components of the adduct compound are mol ratios unless otherwise indicated.

EXAMPLE 1

This example illustrates the use of a 0.004 mol/l DB-21-C-7/HPMo solution.

The adduct solution was produced by dissolving 0.94 g $H_3[PMo_{12}O_{40}]\cdot 29H_2O$ (Merck) and 0.485 g DB-21-C-7, in 100 cm$^3$ nitrobenzene. The solution contained 0.004 mol/l HPMo, based on the mols of phosphorus, and 0.012 mol/l DB-21-C-7. After 20 cm$^3$ of adduct solution had been mixed well with 20 cm$^3$ of a MAW solution of the above-described composition of Table 1, an extraction coefficient D between 30 and 40 was determined for the cesium to be extracted. The fluctuations are due to the fact that the complicated equilibrium between $H^+$, $Na^+$, $K^+$ and $Cs^+$ had not been completely established during the first distribution step.

The organic phase was pipetted off through the aqueous phase, and once again mixed with the same volume (20 cm$^3$) of the MAW of Table 1. A state of equilibrium with the MAW was reached after three discontinuous distribution steps. D was then at 23.

The $Cs^+$ capacity of the 0.004 mol/l DB-21-C-7 adduct solution of this Example was determined by extracting a neutral 0.05 mol/l $CsNO_3$ solution to 0.012 mol $Cs^+$/l (i.e. the found capacity is equal to the theor. capacity $= 3 \times 0.004$). The maximal effective capacity achieved in discontinuous or continuous operation is between 40 and 50% for the MAW of Table 1 because of the high content of $Na^+$. This effective capacity was determined by repeatedly shaking a 100% $Cs^+$ charged adduct solution marked with $Cs^{134}$ with inactive MAW until a state of equilibrium was reached. The practically effective capacity of one liter of the 0.004 mol/l adduct solution thus corresponds to a $Cs^+$ quantity in 160 to 200 l MAW.

Since heteropoly acid adducts with DB-21-C-7 bleed only insignificantly in contrast to the pure heteropoly acid, they are suitable for continuous extraction operation. This insignificant bleeding is demonstrated by a laboratory experiment in which in an extraction apparatus in the form of a mixer-settler unit, as shown in FIG. 1, a total of 1 dm$^3$ of the MAW of Table 1 was put through the extraction apparatus continuously which contained 40 cm$^3$ of the 0.004 mol/l DB-21-C-7/HPMo adduct solution of this Example as stationary organic phase. In this experiment, less than 1% of the HPMo was washed out of the nitrobenzene phase. In comparison, a pure 0.004 mol/l HPMo solution bled more than 90% in the same experiment.

The extraction apparatus contained one 100 cm$^3$ beaker 1, in which a glass cylinder 2 is concentrically located on small spaced apart legs 3. In this manner, a connecting gap 5 is left open directly above the bottom 4 of beaker 1. A mobile MAW phase 6 can pass through connecting gap 5 into a settling chamber 7 which is the space between cylinder 2 and the wall of beaker 1. The interior of glass cylinder 2 defines a mixer chamber 8. In mixer chamber 8, the continuously introduced MAW solution 6 is mixed with the stationarily employed organic phase which can be also continuously circulated, adduct solution 9 by stirring with the aid of a stirrer 10. The continuous thoughput of adduct solution 9 is not shown in FIG. 1.

The mixer-settler unit shown in FIG. 1 is not part of the present invention, but was constructed in accordance with the disclosure in W. Fischer et al., Angew. Chem. Volume 78 (1966) 19. Different devices, however, can be used as well for the process according to the present invention.

As stationary phase, 40 cm$^3$ of the corresponding adduct solution 9 was added into mixer chamber 8. A multiple hose pump, not shown in FIG. 1, having a pump rate of 250 cm$^3$/h, was used to pump mobile MAW phase 6. Thus, the contact times were sufficient for setting the equilibrium and the phase separation was very good in spite of the simple apparatus.

The bleeding of the HPMo adduct can be further reduced, such as to less than 0.5%, if an excess of DB-21-C-7 is used. For example, ⅓ of the crown ether quantity necessary for the production of the 3:1 adducts provides a sufficient excess. The excess, however, does not result in a higher extraction coefficient, and merely serves to stabilize the adduct solution.

Due to the insignificant bleeding of the heteropoly acid adducts, the process according to the present invention also makes possible extractions from solutions with higher and, of course, also with lower $Cs^+$ concentrations than the Cs+ concentration given for the above-mentioned MAW of Table 1 (4 ppm) which, due to precipitate formation, is not possible in the case of the pure HPMo. The adducts employed in the present invention can be used up to pH equal to 7, and even higher if the K+ form is used. See Example 3 below.

Regeneration

The regeneration of the adduct solution, and thus the re-extraction of the Cs+, was achieved with KNO$_3$ or NH$_4$NO$_3$ solutions. A 2 mol/l KNO$_3$ solution had the same re-extraction coefficient $$\overline{D} = \left( \frac{c_{aqueous}}{c_{org.}} \right)$$

as a 5 mol/l NH$_4$NO$_3$ solution, i.e., 41. A 1 mol/l KNO$_3$ solution had a re-extraction coefficient of 20, which is almost the same as the reextraction coefficient of 23 for a 3 mol/l NH$_4$NO$_3$ solution. $\overline{D}$ does not depend on whether the adduct solution is charged, for example, with 0.1% Cs+ or with 100% Cs+. $\overline{D}$ is dependent, however, on the chosen adduct concentration. The higher the adduct concentration, the smaller is $\overline{D}$. Since adduct concentrations equal to or greater than 0.008 mol/l, based on the mols of phosphorus, run the risk that during the regeneration with NH$_4$NO$_3$, the solubility product of the thus resulting NH$_4$+ charged form in the organic phase is exceeded, it is preferred to employ adduct concentrations between 0.004 and 0.006 mol/l, based on the mols of phosphorus, when regenerating with NH$_4$NO$_3$ in the process according to the present invention.

In contrast, if KNO$_3$ was used for the regeneration, it was possible to work with adduct concentrations up to 0.012 mol/l, based on the mols of the phosphorus, without precipitate formation being observed. The regeneration of such an adduct solution with a saturated KNO$_3$ solution (approximately 2.8 mol/l KNO$_3$), provided a $\overline{D}$ value of 13.

After regeneration with NH$_4$NO$_3$, the radioactive Cs can be isolated by means of thermal decomposition of the NH$_4$NO$_3$ in a reactor specifically constructed for the Cs extraction from NH$_4$NO$_3$ solutions. See, J. C. Mora, Enger. Nucl. Vol. 14 (1972) pages 38 to 44.

If KNO$_3$ is used for the regeneration, the resulting KNO$_3$ solution containing Cs can be subjected to further treatment in a less costly and also less dangerous manner than the corresponding NH$_4$NO$_3$ solution containing Cs inasmuch as NH$_4$NO$_3$ tends to puff or to explode. In particular, a KNO$_3$ solution containing Cs was evaporated easily and without danger to form a salt cake with the use of an IR lamp.

The KNO$_3$ salt cake or the residue from the NH$_4$NO$_3$ decomposition can subsequently be transferred to the highly radioactive waste (HAW) or into a suitable solidification matrix.

Since high $\overline{D}$ values are already obtained if 1 mol/l KNO$_3$ is used, it is obvious that the Cs+ extraction is disturbed if higher quantities of K+ are present in the MAW. This disturbance, however, becomes noticeable only if K+ quantities greater than 500 ppm are present in the MAW. Then, the extraction coefficient sinks to values of less than 10. The MAW employed in this example contained only 50 ppm K+.

During the regeneration, from the original H+ form of the adduct, the NH$_4$+ or K+ form (DB-21-C-7/NH$_4$PMo or DB-21-C-7/KPMo), respectively, was formed, which at the beginning of a new discontinuous extraction cycle provided D values of only 12 or 7, respectively, but which gradually approached an equilibrium value between 15 and 20.

EXAMPLE 2

This example illustrates the use of a 0.004 mol/l DB-21-C-7/HPW solution.

Instead of HPMo adducts, adducts with HPW can be employed with equal success in the continuous and discontinuous Cs+ extraction from the above-mentioned MAW of Table 1.

The adduct solution was produced by dissolving 1.33 g H$_3$[PW$_{12}$O$_{40}$].24H$_2$O (Merck) and 4.485 g DB-21-C-7 in 100 cm$^3$ nitrobenzene. The adduct solution contained 0.012 mol/l DB-21-C-7 and 0.004 mol/l HPW, based on the mols of P.

After thoroughly mixing 20 cm$^3$ of the adduct solution with 20 cm$^3$ of the same MAW as in Example 1, extraction coefficients between 30 and 40 were obtained in the first distribution step. After an additional three or four discontinuous distribution steps, D was 22. The Cs+ capacity of the adduct solution in relation to 1 g solid adduct, however, was somewhat smaller due to the higher molar mass of HPW.

A green coloration, occasionally observed in PMo adducts, especially in the H+ form, did not appear with the PW adducts, since HPW is more difficult to reduce and, in contrast to HPMo, is not sensitive to light. The discoloration of the PMo adducts, however, does not have a negative influence on the extraction coefficient, since the Mo, which has possibly been reduced, is reoxidized by the HNO$_3$ when it comes in contact with the MAW. Likewise, the green coloration of the solid DB-21-C-7/HPMo adduct, which could be observed after radiation with a γ dose of 10$^8$ rad, disappeared again when it came in contact with the MAW, and no decrease in the extraction coefficient was noticed.

EXAMPLE 3

This example illustrates the use of a 0.004 mol/l DB-21-C-7/KPW solution containing 0.004 mol/l KPW, based on the mols of P, and 0.016 mol/l DB-21-C-7.

In a mixer-settler unit, as shown in FIG. 1, 40 cm$^3$ of a 4:1 adduct solution, produced by dissolving 1.33 g HPW.24H$_2$O and 0.65 g DB-21-C-7 in 100 cm$^3$ nitrobenzene, was stirred for ½ hour with 20 cm$^3$ of a 2 mol/l KNO$_3$ solution, resulting in conversion into the K+ form. After demixing, most of the KNO$_3$ solution was pumped out and within 2 to 3 hours, 1 liter of a Cs+ free MAW having a pH of 13, was subsequently circulated through continuously. In the following description, this alkaline Cs+ free MAW will be called "MAW 13." The "MAW 13" is drastically simplified, contains the same ion strength as the simulated strongly acid MAW described above in Table 1, and has the following composition:

1.5 mol/l NaNO$_3$; 0.1 mol/l NaOH; 50 ppm K+.

In a corresponding experiment, it was demonstrated that of the components of the MAW of Table 1, only H+, Na+ and K+ have any influence on the Cs+ extraction, thus making this simplification permissible.

After the throughput of the alkaline "MAW 13," the Cs+ capacity of the adduct phase was determined by extracting a neutral 0.1 mol/l CsNO$_3$ solution. The Cs+ capacity thus determined corresponded to the theoretical.Cs capacity of 0.012 mol Cs+/l adduct solution. It was only after further contact of the adduct solution with the "MAW 13" during 4 days, that a 7% reduction in capacity took place. This reduction in capacity corresponds to a loss of 0.9 g HPW per liter of adduct solution. The extraction coefficient for the mentioned "MAW 13" was, after establishment of equilibrium, between 10 and 15.

Therefore, DB-21-C-7 is capable of stabilizing 12-tungstophosphoric acid beyond its normal range of stability. As documented in literature, decomposition of 12-tungstophosphoric acid starts under normal conditions between a pH of 2 and a pH of 3, and is completed between a pH of 7 and a pH of 8, with the decomposition resulting in the formation of hydrogen phosphate and tungstate. This decomposition was confirmed in a corresponding experiment using a HPW-nitrobenzene solution free of crown ether.

EXAMPLE 4

This example illustrates the use of a 0.004 mol/l DB-21-C-7/KPW solution containing 0.004 mol/l KPW, based on the mols of P, and 0.016 mol/l DB-21-C-7.

In a discontinuous extraction, with the organic phase being kept stationary (for comparison see Example 1 part 1), 20 cm$^3$ of a 0.004 mol/l DB-21-C-7 KPW solution having a molar ratio of the adduct components of 4:1, and which had been produced according to Example 3, was alternately brought in contact with the complete strongly acid MAW of Table 1 and with the "MAW 13" which included 4 ppm Cs, with the organic phase being stationary. After a total of 6 distributions, the D value for the strongly acid MAW of Table 1 was 14, and the D value for the strongly alkaline "MAW 13" was 11.

EXAMPLE 5

This example illustrates use of a DB-21-C-7/HSiW solution.

The adduct solution was produced by dissolving 19.0 g of H$_4$[Si(W$_3$O$_{10}$)$_4$]x H$_2$O (Merck) and 9.7 g DB-21-C-7 in 1 dm$^3$ nitrobenzene. The adduct solution contained 0.003 mol/l HSiW, based on the mols of Si, and 0.012 mol/l DB-21-C-7 to provide a 4:1 adduct.

A quantity of 20 ml of the adduct solution produced in this manner was shaken for 1 hour with 20 ml of the MAW described in Table 1. An extraction coefficient of 24.8 was obtained for the Cs+.

In comparison, an extraction was performed using a pure HSiW solution and resulted in an extraction coefficient D of 0.02. Furthermore, due to its low solubility in nitrobenzene, the HSiW had to be added to the aqueous phase in an amount of 0.003 mol/l.

EXAMPLE 6

This example illustrates the use of a DB-24-C-8/HPMo adduct solution.

The adduct solution was produced by dissolving 5.4 g of DB-24-C-8 and 9.4 g of HPMo.29H$_2$O in nitrobenzene. The adduct solution contained 0.004 mol/l HPMo, based on the mols of P, and 0.012 mol/l DB-24-C-8 to provide a 3:1 adduct.

A quantity of 20 ml of the adduct solution produced in this manner was shaken for 1 hour with 20 ml of a solution of 4 ppm Cs in 1 mol/l HNO$_3$. An extraction coefficient of 5.5 was obtained for Cs+.

EXAMPLE 7

This example illustrates the use of a B-15-C-5/HPMo adduct solution.

The adduct solution was produced by dissolving 3.2 g B-15-C-5 and 9.4 g HPMo.29H$_2$O in 1 dm$^3$ of nitrobenzene. The adduct solution contained 0.004 mol/l HPMo, based on the mol of P, and 0.012 mol/l B-15-C-5 to provide a 3:1 adduct.

A quantity of 20 ml of the adduct solution produced in this manner was shaken for 1 hour with 20 ml of a solution of 4 ppm Cs in 1 mol/l HNO$_3$. An extraction coefficient of 8.2 was obtained for Cs.

EXAMPLE 8

This example illustrates the use of a [3:1] B-15-C-5/HPMo adduct solution containing $3.4.10^{-4}$ mol/l HPMo, based on the mols of P, and $1.10^{-3}$ mol/l B-15-C-5.

The adduct solution was produced in a manner similar to that used in Example 10 below. A quantity of 20 ml of the adduct solution was shaken for 1 hour with 20 ml of a 4 ppm Cs+ solution in H$_2$O (neutral). An extraction coefficient D of 468, corresponding to a % extraction of 99.79%, was obtained for Cs+. The D value remained practically unchanged even after the second distribution step, and was 466 which corresponds to a 99.79% extraction.

In comparison, an extraction was performed with a pure 0.004 mol/l HPMo solution, and resulted in a % extraction of 85.4%. Of the Cs+, 10.5% were precipitated as non-extractable, difficultly soluble CsPMo precipitate. Simultaneously, a strong bleeding of the organic phase was observed. After the second distribution step, the extraction coefficient D was at 5.4.

EXAMPLE 9

This example illustrates the use of a DB-21-C-7/HPMo solution.

The adduct solution was produced by dissolving 12.4 g of solid DB-21-C-7/HPMo [3:1] adduct in 1 dm$^3$ of a 1:1 mixture (v/v) of nitrobenzene and chloroform. The adduct solution contained 0.004 mol/l HPMo and 0.012 mol/l DB-21-C-7.

A quantity of 20 ml of the adduct solution thus produced was shaken for 1 hour with 20 ml of MAW. An extraction coefficient of 16.8 was obtained for Cs+.

EXAMPLE 10

This example illustrates the use of a DB-18-C-6/HPMo solution.

The adduct solution was produced by dissolving 1 g of a DB-18-C-6/HPMo [3:1] adduct, obtained by precipitation from a homogenous solution, in 1 dm$^3$ nitrobenzene. The adduct solution contained $3.4.10^{-4}$ mol/l HPMo, based on the mols of P, and $1.10^{-3}$ mol/l DB-18-C-6.

A quantity of 20 ml of the adduct solution produced in this manner was shaken for 1 hour with 20 ml of a solution of Cs$^{137}$ tracer quantities in H$_2$O. An extraction coefficient of 100.6 was obtained for Cs+.

EXAMPLE 11

This example illustrates the use of a 0.012 mol/l DB-21-C-7/HPW solution.

The adduct solution was produced by dissolving 4.0 g of H$_3$[P(W$_3$O$_{10}$)$_4$].24H$_2$O (Merck) and 1.45 g DB-21-C-7 in 100 ml of a 3:1 mixture (v/v) of nitrobenzene and 1,1,2,2-tetrachloroethane having a density of about 1.3 g/cm³. The adduct solution contained 0.012 mol/l HPW, based on the mols of P, and 0.036 mol/l DB-21-C-7 to provide a 3:1 adduct. A quantity of 20 ml of the adduct solution produced in this manner was shaken for 1 hour with 20 ml of a strongly acid simulated MAW having a density of about 1.2 g/cm³ and a high Na⁺ content, and whose chemical analysis is stated in Table 4 below.

The extraction coefficient for Cs⁺ was 6.1.

A re-extraction was performed with a saturated KNO₃ solution and resulted in a re-extraction coefficient $\overline{D}$ of 13.

In comparison, an extraction was performed with a pure 0.012 mol/l HPW or HPMo solution. Cs⁺ was almost quantitatively precipitated as non-extractable CsPW or CsPMo precipitate. The precipitation was favorably influenced by the high Na⁺ concentration.

Instead of the 1,1,2,2-tetrachloroethane used in this example, chloroform can also be used as a solvent component in a 3:1 mixture (v/v) with nitrobenzene.

TABLE 4

| Component | Concentration g/dm³ | |
| --- | --- | --- |
| HNO₃ | 50.4 | (0.8 mol/l) |
| NaNO₃ | 289 | (3.4 mol/l) |
| Uranium | 1.9 | |
| Calcium | 1.6 | |
| Magnesium | 0.8 | |
| Iron | 0.4 | |
| Molybdenum | 0.4 | |
| Aluminum | 0.24 | |
| Copper | 0.16 | |
| Zinc | 0.16 | |
| Chromium | 0.08 | |
| Potassium | 0.08 | |
| Manganese | 0.08 | |
| Nickel | 0.08 | |
| Zirconium | 0.08 | |
| Ruthenium | 0.006 | |
| Cesium | 0.004 | |
| Strontium | 0.001 | |

It will be understood that the above description of the present invention is susceptible to various modifications, changes and adaptions, and the same are intended to be comprehended within the meaning and range of equivalents of the appended claims.

What is claimed is:

1. Process for the extraction of cesium ions from an aqueous solution with an adduct compound containing a macrocyclical polyether and an inorganic heteropoly acid component, comprising:
   (a) producing an organic phase in the form of a solution of an adduct compound in a polar organic solvent, the adduct compound being the product of (i) a crown ether containing at least one species of the structural elements

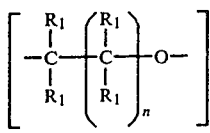

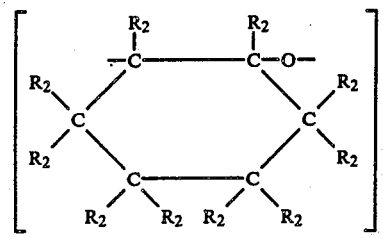

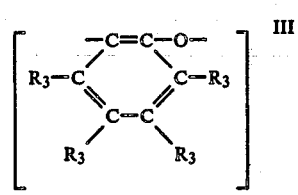

where, in structure I, n represents one of the numbers 0, 1 or 2, the —C—(C)ₙ—O group forms part of the polyether ring and R₁ is H,CH₃, phenyl up to 4 R₁(≠H); in structure II, the —C—C—O— group forms part of the polyether ring and R₂ is H,CH₃, t-butyl, pentyl, heptyl, nonyl, (CH₂)₉CH₃, phenyl up to 2 R₂(≠H); and in structure III, the —C=C—O group forms part of the polyether ring and R₃ is H,CH₃, t-butyl, pentyl, heptyl, nonyl, (CH₂)₉CH₃, phenyl up to 2 R₃(≠H); with (ii) an inorganic heteropoly acid which is stable in a strongly acid and oxidizing medium, or a salt of the inorganic heteropoly acid;
   (b) bringing the aqueous solution containing the cesium ions into contact with the adduct compound solution to extract the cesium from the aqueous solution into the organic phase and thereby charge the organic phase; and
   (c) separating the charged organic phase from the aqueous solution.

2. Process as defined in claim 1, wherein the solution of the adduct compound contains, as polar organic solvent, nitrobenzene, or a mixture of nitrobenzene and at least one solvent from the group 1,1,2,2-tetrachloroethane, chloroform, 1,2-dichloroethane and 1,2-dichlorobenzene.

3. Process as defined in claim 1, wherein the solution of the adduct compound, before its contact with the aqueous, cesium ions containing solution, is applied as a liquid ion exchanger phase on silica gel as carrier material.

4. Process as defined in claim 1, wherein the adduct solution is produced by employing a crown ether selected from dibenzo-18-crown-6, dicyclo-hexyl-18-crown-6, or higher homologues thereof having up to 30 atoms in ring form, and containing up to 10 oxygen atoms, and benzo-15-crown-5.

5. Process as defined in claim 4, wherein the adduct compound is produced by dissolving an adduct compound in the H⁺ form, in the polar organic solvent, the adduct compound having been obtained in amorphous or crystalline state by mixing (a) a crown ether solution with (b) a heteropoly acid solution and then separating the solvents which were used to form solutions (a) and (b).

6. Process as defined in claim 5, wherein the crown ether solution and the heteropoly acid solution each contain acetone as a solvent.

7. Process as defined in claim 5, wherein the crown ether solution contains dioxane as solvent, and the heteropoly acid solution comprises an aqueous $HNO_3$ solution.

8. Process as defined in claim 4, wherein the solution of the adduct compound is produced by dissolving an adduct compound in an existing M(I) charged form, where M(I) is Na, K, Tl or $NH_4$, the adduct compound having been obtained in amorphous or crystalline state by adding a M(I) nitrate solution to a clear solution of a crown ether and a heteropoly acid to precipitate the adduct compound, and then separating solvents from the precipitated adduct compound.

9. Process as defined in claim 8 wherein the crown ether is a dibenzo crown ether.

10. Process as defined in claim 8 or 9, wherein the clear solution is obtained by mixing an aqueous solution of the heteropoly acid with a dioxane solution of the crown ether.

11. Process as defined in claim 1, wherein the heteropoly acid is selected from 12-molybdophosphoric acid (HPMo); 12-tungstophosphoric acid (HPW); 12-molybdosilicic acid (HSiMo); or 12-tungstosilicic acid (HSiW).

12. Process as defined in claim 5, wherein the adduct solution is produced by dissolving the individual adduct components in nitrobenzene, in the molar ratio crown ether to HPMo of $\geq 3:1$; crown ether to HPW of $\geq 3:1$; crown ether to HSiMo of $\geq 4:1$; and crown ether to HSiW of $\geq 4:1$.

13. Process as defined in claim 1, wherein the adduct compound is the product of (i) a crown ether with an polyether ring containing 21 atoms and 7 O-atoms with one or more $R_1$ and/or $R_2$ and/or $R_3$ ($R_1$=H, $CH_3$, phenyl, $R_2$=H, $CH_3$, t-butyl, pentyl, heptyl, nonyl, $(CH_2)_9CH_3$, phenyl $R_3$=H, $CH_3$, t-butyl, pentyl, heptyl, nonyl, $(CH_2)_9CH_3$, phenyl) with (ii) an inorganic heteropoly acid or a salt of the inorganic heteropoly acid.

* * * * *